May 29, 1923.
W. S. SMITH
SPRING SCALE
Filed Dec. 30, 1920
1,457,194
2 Sheets-Sheet 1
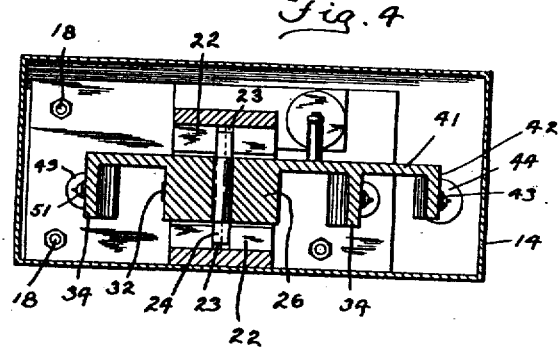
Fig. 4
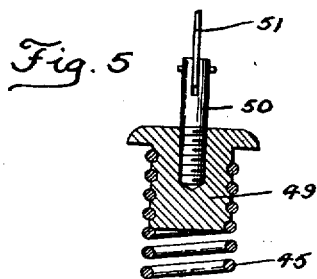
Fig. 5
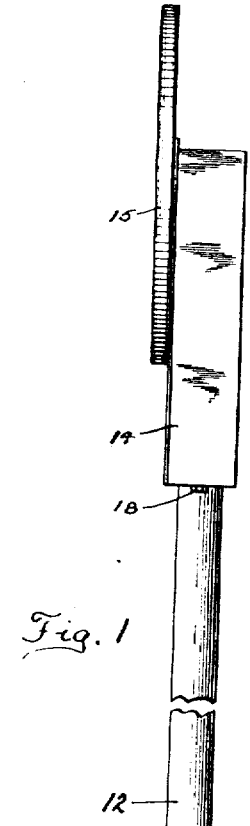
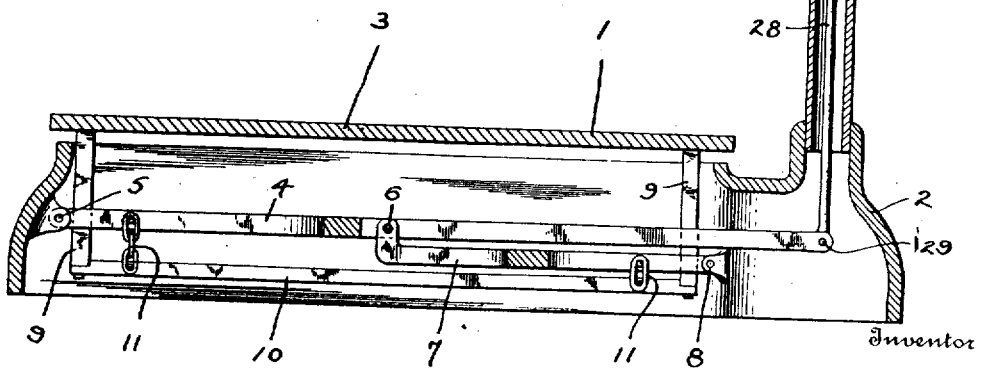
Fig. 1
Inventor
Walter S. Smith.
By C. C. Shepherd
Attorney

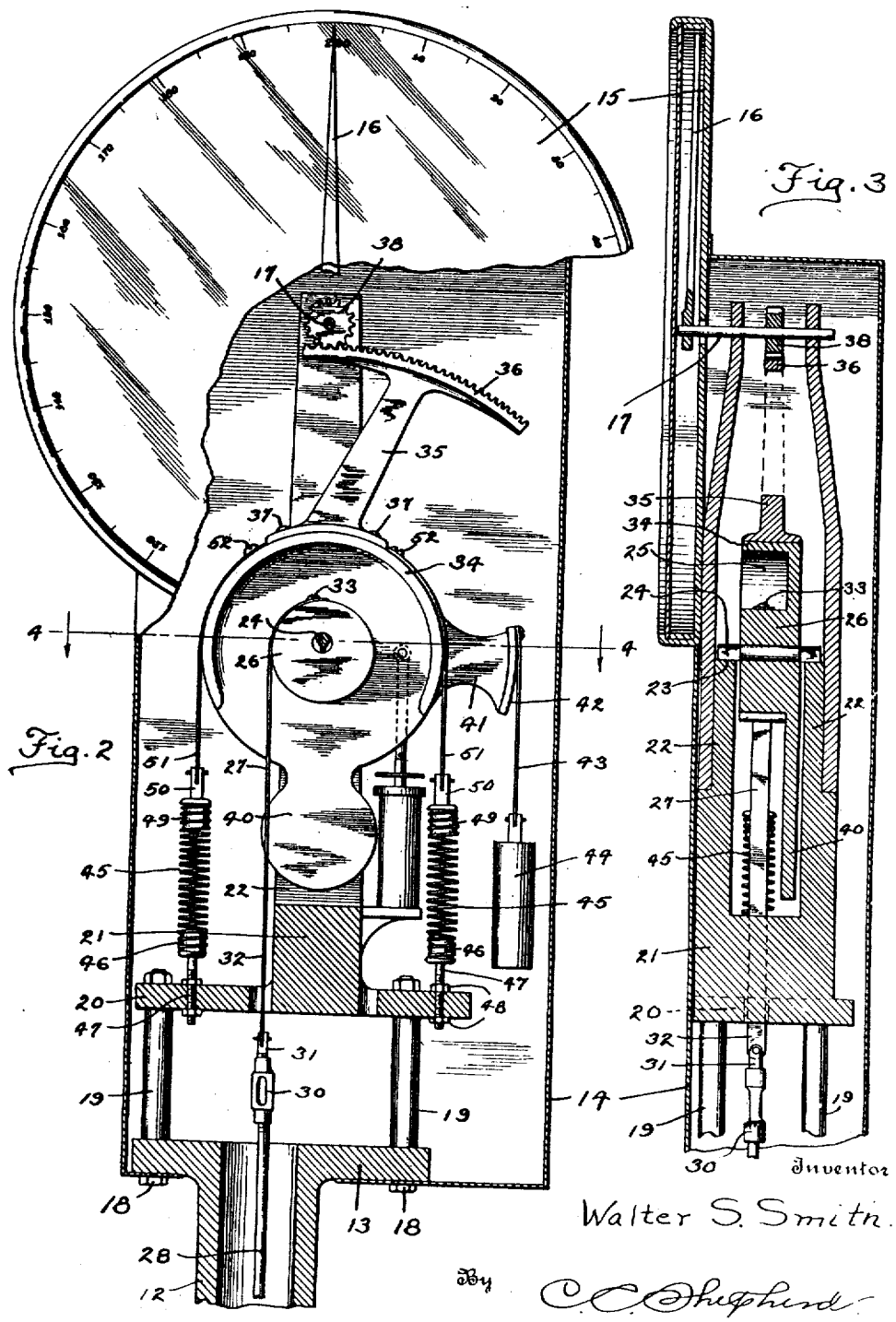

Patented May 29, 1923.

1,457,194

UNITED STATES PATENT OFFICE.

WALTER S. SMITH, OF COLUMBUS, OHIO.

SPRING SCALE.

Application filed December 30, 1920. Serial No. 433,968.

*To all whom it may concern:*

Be it known that WALTER S. SMITH, a citizen of the United States, residing at Columbus, in the county of Franklin and State of Ohio, has invented certain new and useful Improvements in Spring Scales, of which the following is a specification.

This invention relates to scales and is more specifically confined to the spring balance type. A structure has been provided, and the parts thereof have been so arranged and associated that the indicating mechanism will, with ease, and without being in any way affected by extraneous influences, register an accurate weight.

One of the salient features of my invention is in the fact that the entire scale mechanism is unaffected by such influences and conditions as level, large temperature variations, continuous or intermittent vibrations, etc. My spring structure is so arranged and constructed that temperature variation is automatically compensated for and corrected so that the weighing result at all temperatures is not affected.

Another object of my invention is to overcome one of the inherent structural errors common in scales of this type, namely to hold the main functioning oscillatory element of the weighing mechanism firmly in its seat under all conditions, such as rapid application of weights or their removal or by sudden applications of weights. By properly maintaining the parts seated under these conditions, I am assured of a proper weight registration.

A further object of this invention also is the provision of a structure and arrangement of weighing principle which may be readily combined with an indicating structure with any degree of multiplication between the two. In this manner, a scale having a large or a small capacity may be very readily constructed.

With these and other objects in view, as will appear as the description proceeds, the invention accordingly consists in the novel features of construction, combinations of elements and arrangements of parts, hereinafter to be fully described and pointed out in the appended claims.

In the accompanying drawings, forming a part of this specification, and in which similar characters of reference denote like and corresponding parts throughout the several views thereof:

Figure 1 is a side elevation of a scale constructed in accordance with the principles of the invention, Figure 2 is a vertical transverse sectional view taken through the weight indicating mechanism of the scale and the actuating structure therefor, Figure 3 is a vertical sectional view taken through the structure disclosed in Figure 2, Figure 4 is a horizontal sectional view taken along the plane disclosed by the line 4—4 of Figure 2, and Figure 5 is a detail sectional view of one of the connections between one of the balancing springs and the actuator.

Referring more particularly to the details of the invention an embodiment thereof has been shown in the accompanying drawings, in which the numeral 1 designates the improved scale in its entirety. In the illustrated embodiment of the invention, the numeral 2 designates the castiron base of the scale, the numeral 3 the weight or commodity receiving platform thereof. Situated within the base 2 is the usual master beam 4, which is pivotally mounted as at 5 upon one of the interior walls of a base. This beam is centrally pivoted intermediately of its length, as at 6, with the forward end of an ordinary Y lever 7, the latter having its rear ends pivoted as at 8 to the base 2. Depending from the platform 3 are the usual rigid legs 9, which have their lower ends connected by means of longitudinally extending members 10. Flexible connections 11 of ordinary utility are provided between the beam 4, the lever 7 and the members 10, and operate in the usual manner to pull the beam downwardly upon the application of weight to the platform 3. This base construction is to be found in the average platform type of scale, and hence the same in itself does not enter into the present invention, except in a mere co-operative sense with certain of the remaining elements of the scale to be hereinafter described. It will be understood, however, by the provision of the connections set forth the beam 4 will be oscillated a distance regulated by the character of the weight placed upon the platform 3, and that the disposition of the weight upon said platform will also not effect the degree of oscillation of said beam.

Arising from the base 2 is a tubular standard 12 which may be of any desired height, the upper end thereof being terminated in a flange 13. Connected with this flange is the lower end of a casing 14, in which is enhoused the weight indicating mechanism of the scale and the operating structure therefor. Also, connected with the outer portion of the casing 14 is a suitable type of scale dial 15, which is suitably graduated to indicate any desired number of pounds or fractions thereof, said dial being provided with the usual weight indicating finger or indicator 16, which is connected with a shaft 17 for rotation around the dial.

In order to transmit motion from the beam 4 to the indicator 16 in a manner proportionate to the character of the weight deposited upon the platform 3, the flange 13 of the standard 12 is provided with a plurality of upstanding bolts 18, around which sleeves 19 are positioned. The upper ends of the bolts 18 are positioned within openings provided within a flange 20 of a frame 21, which extends in an upright manner within the casing 14. The ends of the bolts 18 are equipped with suitable nuts, whereby the frame 21 may be securely connected in clamped relationship with the standard 12. The vertical portion of the frame 21 is bifurcated to provide spaced arms 22, which have their inner ends terminated in V-shaped sockets 23 for the reception of the knife edge trunnions 24 of the weight indicating mechanism actuator 25.

This actuator, in the present form of the invention, is shaped to constitute a drum through which the trunnions 24 axially project, and by this construction the said actuator or drum is permitted to pivotally oscillate upon its support by means of the arms 22. The actuator 25 includes a hub portion 26 which has an outer surface disposed concentrically with respect to the pivotal axis of the actuator. To the outer surface of the portion there is connected the upper end of a pull connection 27 which unites the beam 4 and the actuator for simultaneous movement. This connection consists of a vertically extending rod 28, which has its lower end pivotally connected as at 29 with the rear end of the beam 4. The rod 28 extends upwardly through the tubular standard 12 and has its upper end threaded to receive a union 30. The opposite end of this union is connected with a threaded stud 31, which has a bifurcated end, and a flexible strap 32 constitutes the remainder of the connection. This strap has its lower end secured to the bifurcated end of the stud 31, while the upper end of the strap 32 is trained around the circumferential surface of the hub portion 26, and is secured to said surface by means of a set screw 33. Obviously, through the provision of the union 30 any slackness which may exist or occur within the connection 27 may be readily taken up. By the construction described it will be apparent that upon application of weight to the platform 3 the beam 4 will be oscillated, causing its free or rear end to be rocked downwardly. This downward movement is then imparted to the connection 27, which, by reason of its connection 33 with the actuator 25, will cause said actuator to be rocked or oscillated about its trunnioned pivot 24. It will be appreciated that the extent of oscillation of the actuator will be governed proportionately to the weight imposed upon the platform 3.

The motion of the actuator is preferably transmitted to the weight indicating mechanism 16 by providing the actuator with an outer circumferential flange 34, upon which is mounted the angularly extending arm 35 of a gear segment 36, said arm 35 being connected with the flange 34 rigidly, by means of fastening devices 37. The segment 36 is so positioned that one end of the same will normally mesh with a pinion 38, carried by the indicator shaft 17 and it follows that by virtue of this construction, the rotation of the actuator will be governed by uniform movement on the part of the segment 36 which by meshing with the pinion 38, will cause the rotation of the shaft 17, thereby causing the rotation of the indicator hand 16 around the dial face 15, the movement of said hand in each operation being governed by the extent of oscillation of the actuator 25 which, in turn, has its oscillation governed by the character of the weight imposed upon the platform 3. To balance the actuator, the same is provided with a depending weight 40, which compensates for the inclusion of the offset segment 36, thereby balancing the actuator as a whole. To further effect the balance of the actuator, one side of the same is provided with an offset arm 41 which is provided with a segmental surface 42. A tape 43 is connected with the upper portion of this surface and has its lower end connected with a depending weight 44, which weight acts to counterbalance the platform structure and the connection 27.

A primary feature of the present invention consists in providing a spring balance for the actuator 25 which will normally serve to maintain said actuator in a neutral position, and which will tend to resist movement on the part of the actuator and will operate to eliminate error in the scale by reason of extraneous influences. To this end, a pair of springs 45 are provided. These springs are of the coiled contractable type, and have their lower ends connected with the enlarged spirally grooved heads 46 of bolts 47, the latter having threaded shanks extended through openings provided in the flange of the frame 21 and maintained in secured relationship with said flange by nuts 48. The upper ends of said springs are similarly connected, as shown in Figure 5, with spirally grooved connecting members 49, which members are provided with threaded bores in which are positioned the lower threaded ends of bifurcated studs 50. These studs are so positioned that their bifurcated ends will receive the lower ends of a pair of flexible tapes 51, which have their upper ends passed around the flange 34 of the actuator and secured as at 52 to opposed axial portions thereof, by this construction it will be manifest that by adjusting the tension of the springs 45 so that the latter will pull evenly upon their tapes 51, the actuator 25 will be maintained normally in a position of true balance, in which the segment 36 will be so positioned that the indicator 16 will normally occupy a zero position upon the dial 15. Manifestly, by this spring balance vibration will not affect the scale, nor will irregularities in the level of the scale. This is a desirable feature, in that it enables the scale to be roughly positioned for perfect operation and eliminates the necessity of carefully adjusting the scale to secure an absolute leveling thereof. Also, by the inclusion of the springs 45, and particularly their peculiar arrangement, temperature fluctuations will not effect the readings of the scale, since it is apparent that the springs may contract and expand equally, a feature which serves to maintain the actuator 25 in its true neutral position. By adjusting the nuts 48 any desired tension of the springs 45 may be secured and to cause the latter to act equally upon the actuator. When weight is applied to the platform 3, the springs serve to resist and regulate the extent of oscillation of the actuator, one spring being forced to expand, while the other is allowed to contract, thereby maintaining the balance of the actuator and at the same time limiting and regulating the degree of oscillation of the actuator. When weight is relieved from the platform 3, the springs automatically serve to restore the actuator to its normal position, and to thereby return the indicator hand to zero.

From the foregoing description, taken in conjunction with the accompanying drawings, it will be apparent that a scale is provided wherein the objects of the invention are to be attained and wherein all of the advantages above pointed out are, among others, present. By the peculiar spring arrangement recited the advantages of the invention are primarily achieved, said spring arrangement serving to avoid error in the readings of the scale, and to provide a spring scale which will operate efficiently even when subjected to adverse climatic conditions or temperatures, since the springs 45 contract or expand equally, hence their effect upon the actuator will be uniform at all times. Frequently, scales of this nature are employed in establishments wherein rolling machinery is to be found. This machinery frequently sets up a considerable amount of vibration, which under normal conditions has a detrimental effect upon adjacent scales. However, by the construction described, the springs 45 normally serve to retain the actuator motionless, thereby preventing vibration from being transmitted to the indicator hand. It will of course be appreciated that the principles above set forth are not limited to the platform type of scale disclosed but may be utilized with equal effect in scales of any nature or purpose. While the foregoing description specifically sets forth what is now believed to be the best mode of applying the principles of the invention, yet it should be understood that said description does not necessarily measure the invention, except as the latter is defined by the following claims.

What is claimed is:

1. In a scale, a beam structure and a weighing platform associated therewith, an oscillatably mounted actuator, a connection between said actuator and said beam structure, balanced spring mechanism cooperative with axially opposite portions of said actuator for normally maintaining the latter in neutral position, said mechanism being flexibly connected with the actuator and weight indicating mechanism arranged to register in accord with the movement of said actuator.

2. In a scale, a beam structure and a weighing platform associated therewith, an oscillatably mounted actuator, a connection between said actuator and said beam structure, a pair of spring structures flexibly connected with the actuator and cooperating with axially opposite portions of said actuator and balanced against each other to normally hold said actuator in neutral position, said spring structures being located beneath the level of said pivotal mounting to hold said actuator seated in its mounting, and weight indicating mechanism arranged to register in accord with the movement of said actuator.

3. In a scale, a beam structure and a weighing platform associated therewith, a pivotally mounted pull drum, a connection between said beam structure and said drum, a spring structure balanced to exert equal influences to opposite sides of the pivotal mounting of said drum independently of said connection, and weight indicating mechanism arranged to register in accord with the movement of said drum.

4. In a scale, a beam structure and a weighing platform associated therewith, a pivotally mounted pull drum, a connection between said beam structure and said drum, a spring structure balanced to exert equal influences to opposite sides of the pivotal mounting of said drum independently of said connection, and arranged to hold said drum seated in its pivotal mounting, and weight indicating mechanism arranged to register in accord with the movement of said drum.

5. In a scale, a beam structure and a weighing platform associated therewith, a pivotally mounted pull drum, a connection between said beam structure and said drum, a pair of spring structures balanced against each other and arranged to exert their individual influences to opposite sides of the pivotal mounting of said drum independently of said connection, and weight indicating mechanism arranged to register in accord with the movement of said drum.

6. In a scale, a beam structure and a weighing platform associated therewith, a pivotally mounted pull drum, a connection between said beam structure and said drum, a pair of spring structures balanced against each other and arranged to exert their individual influences to opposite sides of the pivotal mounting of said drum independently of said connection, said spring structures being located beneath the level of said pivotal mounting to hold said drum seated in its mounting, and weight indicating mechanism arranged to register in accord with the movement of said drum.

7. In a scale, a beam structure and a weighing platform associated therewith, a pivotally mounted pull drum, a connection between said drum and said beam structure, a pair of springs of the same effective size and expansive properties balanced against each other and arranged on opposite sides of the pivotal mounting of said drum independently of said connection and located beneath the level of said pivotal mounting to hold the drum seated in its mounting, and weight indicating mechanism arranged to register in accord with the movement of said drum.

8. In a scale, a beam structure and a weighing platform associated therewith, a double diameter pivotally mounted pull drum, a flexible connection between said beam structure and said drum, said connection being connected to operate off one of said diameters, a pair of springs of the same effective size and expansive properties balanced against each other and arranged on opposite sides of the pivotal mounting of said drum, flexible connections connecting said springs with said drum on the other of said diameters, said springs being located beneath the level of said pivotal mounting to hold said drum seated in its mounting, a counter-balance carried by said drum for said first mentioned connection and beam structure, and weight indicating mechanism operated by the oscillation of said drum.

9. In a scale, a beam structure and a weighing platform associated therewith, a pivotally mounted pull drum, a flexible connection operating off said drum and connecting it with said beam structure, a pair of spring structures provided with flexible connections to operate off said drum balanced against each other and arranged to exert their individual influences upon opposite sides of said drum by means of their flexible connections, and weight indicating mechanism arranged to register in accord with the movement of said drum.

10. In a scale, a beam structure and a weighing platform associated therewith, a pivotally mounted pull drum, a flexible connection operating off said drum and connecting it with said beam structure, a pair of spring structures provided with flexible connections to operate off said drum balanced against each other and arranged to exert their individual influences upon opposite sides of said drum by means of their flexible connections, said spring structures and their flexible connections being located beneath the level of said pivotal mounting to hold said drum seated in its mounting, and weight indicating mechanism arranged to register in accord with the movement of said drum.

In testimony whereof I affix my signature.

WALTER S. SMITH.